United States Patent
Stewart

(10) Patent No.: US 11,820,003 B2
(45) Date of Patent: Nov. 21, 2023

(54) DEFORMABLE GRIPPER ARM

(71) Applicant: The Heil Co., Chattanooga, TN (US)

(72) Inventor: Bryan Stewart, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/584,937

(22) Filed: Jan. 26, 2022

(65) Prior Publication Data
US 2022/0234823 A1     Jul. 28, 2022

Related U.S. Application Data

(60) Provisional application No. 63/141,767, filed on Jan. 26, 2021.

(51) Int. Cl.
| | |
|---|---|
| *B25J 15/12* | (2006.01) |
| *B65F 3/02* | (2006.01) |
| *B65F 3/04* | (2006.01) |

(52) U.S. Cl.
CPC .............. *B25J 15/12* (2013.01); *B65F 3/046* (2013.01); *B65F 2003/023* (2013.01); *B65F 2003/0226* (2013.01); *B65F 2003/0266* (2013.01); *B65F 2003/0276* (2013.01); *Y10S 294/902* (2013.01)

(58) Field of Classification Search
CPC ........ B65F 2003/0226; B65F 2003/023; B25J 15/12; Y10S 294/902
USPC ................................. 294/99.1, 902
See application file for complete search history.

(56) References Cited

U.S. PATENT DOCUMENTS

| | | |
|---|---|---|
| 3,667,797 A | 6/1972 | Kilby |
| 4,175,903 A | 11/1979 | Carson |
| 4,461,608 A | 7/1984 | Boda |
| 5,020,844 A | 6/1991 | Pickrell |
| 5,092,731 A | 3/1992 | Jones et al. |
| 5,209,537 A | 5/1993 | Smith et al. |

(Continued)

FOREIGN PATENT DOCUMENTS

FR     2632938 A1 * 12/1989    ........ B65F 2003/023

OTHER PUBLICATIONS globalindustrial.com [online], "Valley Craft® Economy Auto Grip Lift Truck Attachment F89743-1500 Lb. Cap.," Apr. 5, 2017, retrieved on Sep. 27, 2022, retrieved from URL <https://www.globalindustrial.com/p/economy-auto-grip-lift-truck-attachment-1500-lb-cap>, 3 pages.

(Continued)

*Primary Examiner* — James Keenan
(74) *Attorney, Agent, or Firm* — Fish & Richardson P.C.

(57) ABSTRACT

A refuse collection vehicle includes a refuse grabber assembly, a lift arm coupled to the refuse grabber assembly, and a hopper configured to receive refuse from the refuse container. The lift arm is operable to position the refuse grabber assembly. The refuse grabber assembly includes a first grabber arm and a second grabber arm that are configured to cooperate to engage the refuse container. The first grabber arm includes a first gripper and a first support arm coupled to the first gripper. The first gripper includes a first deformable structure configured to contact a first surface of a refuse container. The second grabber arm includes a second gripper and a second support arm coupled to the second gripper. The second gripper includes a second deformable structure configured to contact a second surface of the refuse container.

18 Claims, 10 Drawing Sheets

(56) References Cited

U.S. PATENT DOCUMENTS

| | | | |
|---|---|---|---|
| 5,242,202 A * | 9/1993 | Ettinger | G01B 5/255 294/93 |
| 5,513,942 A | 5/1996 | Pickrell | |
| 5,562,386 A | 10/1996 | Browning | |
| 5,577,877 A | 11/1996 | Smith et al. | |
| 5,711,565 A | 1/1998 | Smith et al. | |
| 5,846,044 A | 12/1998 | Smith et al. | |
| 5,863,086 A | 1/1999 | Christenson | |
| 5,927,056 A * | 7/1999 | Renehan | A01D 46/26 56/340.1 |
| 6,095,744 A * | 8/2000 | Harrison | B65F 3/046 414/812 |
| D476,208 S | 6/2003 | Lee | |
| D609,524 S | 2/2010 | O'Neal | |
| D651,225 S | 12/2011 | Koike et al. | |
| D651,626 S | 1/2012 | Koike et al. | |
| D651,881 S | 1/2012 | Blockburger | |
| D685,974 S | 7/2013 | Price et al. | |
| 8,833,823 B2 | 9/2014 | Price et al. | |
| D717,622 S | 11/2014 | Bradley et al. | |
| D782,274 S | 3/2017 | Herrick et al. | |
| D816,138 S | 4/2018 | Schulnig | |
| 10,221,012 B2 | 3/2019 | Hund, Jr. | |
| D876,192 S | 2/2020 | Su | |
| 11,097,430 B2 * | 8/2021 | Onal | B25J 15/10 |
| D940,898 S | 1/2022 | Chiappetta | |
| D977,321 S | 2/2023 | Stewart | |
| 2008/0083302 A1 | 4/2008 | Hood et al. | |
| 2010/0095799 A1 | 4/2010 | Albin et al. | |
| 2010/0164243 A1 | 7/2010 | Albin | |

OTHER PUBLICATIONS heil.com [online], "Heil® Automated Front-Load Garbage Trucks," Apr. 24, 2020, retrieved on Sep. 27, 2022, retrieved from URL <https://www.heil.com/type/automated-front-loaders/>, 8 pages.

jalopnik.com [online], "Here's How Garbage Truck Robot Arms Work: An Explainer," Jan. 7, 2022, retrieved on Sep. 27, 2022, retrieved from the URL <https://jalopnik.com/heres-how-garbage-truck-robot-arms-work-an-explainer-1848322146>, 9 pages.

International Search Report and Written Opinion in International Appln. No. PCT/US2021/057406, dated Feb. 1, 2022, 11 pages.

* cited by examiner

DEFORMABLE GRIPPER ARM

CROSS-REFERENCE TO RELATED APPLICATIONS

This application claims the benefit under 35 U.S.C. § 119(e) of U.S. Patent Application No. 63/141,767, entitled "Deformable Gripper Arm," filed Jan. 26, 2021, which is incorporated herein by reference in its entirety.

TECHNICAL FIELD

This disclosure relates to systems and method for operating a refuse collection vehicle to engage a refuse container.

BACKGROUND

Refuse collection vehicles have been used for generations for the collection and transfer of waste. Traditionally, collection of refuse with a refuse collection vehicle required two people: (1) a first person to drive the vehicle and (2) a second person to pick up containers containing waste and dump the waste from the containers into the refuse collection vehicle. Technological advantages have recently been made to reduce the amount of human involvement required to collect refuse. For example, complex devices to engage refuse containers, such as mechanical or robotic lift arms, have been implemented. Some containers may be crushed while engaged by the lift arms.

SUMMARY

Many aspects of the disclosure feature operating a mechanical lift arm and grabber to perform refuse collection.

In an example implementation, a refuse collection vehicle includes a refuse grabber assembly, a lift arm coupled to the refuse grabber assembly, and a hopper configured to receive refuse from a refuse container. The lift arm is operable to position the refuse grabber assembly. The refuse grabber assembly includes a first grabber arm and a second grabber arm that are configured to cooperate to engage the refuse container. The first grabber arm includes a first gripper and a first support arm coupled to the first gripper. The first gripper includes a first deformable structure configured to contact a first surface of a refuse container, the first deformable structure defining a first lattice with a first internal web that deforms in response to application of a threshold force on a surface of the first gripper. The second grabber arm includes a second gripper and a second support arm coupled to the second gripper. The second gripper includes a second deformable structure configured to contact a second surface of the refuse container, the second deformable structure defining a second lattice with a second internal web that deforms in response to application of a threshold force on a surface of the second gripper.

In an aspect combinable with the example implementation, the first internal web includes at least two adjacent non-parallel walls and the second internal web includes at least two adjacent non-parallel walls.

In another aspect combinable with any of the previous aspects, the first deformable structure includes a first plurality of openings, wherein at least one opening of the first plurality of openings is configured to collapse in response to application of a threshold force a first surface of the first deformable structure, and the second deformable structure includes a second plurality of openings, wherein at least one opening of the second plurality of openings is configured to collapse in response to application of the threshold force to a second surface of the second deformable structure.

In another aspect combinable with any of the previous aspects, each opening of the first plurality of openings and the second plurality of openings are triangular shaped.

In another aspect combinable with any of the previous aspects, the first gripper includes a first insert surrounded by and coupled to the first deformable structure, and the second gripper includes a second insert surrounded by and coupled to the second deformable structure.

In another aspect combinable with any of the previous aspects, the first insert includes a third plurality of openings therethrough, and the second insert includes a fourth plurality of openings therethrough.

In another aspect combinable with any of the previous aspects, at least one of the third plurality of openings is configured to receive a first fastener, and at least one of the fourth plurality of openings is configured to receive a second fastener.

In another aspect combinable with any of the previous aspects, the refuse grabber assembly includes a first plurality of fasteners configured to couple the first gripper to the first support arm, and a second plurality of fasteners configured to couple the second gripper to the second support arm.

In another aspect combinable with any of the previous aspects, the first insert is coupled to the first gripper through at least one opening of the third plurality of openings, and the second insert is coupled to the second gripper through at least one opening of the fourth plurality of openings.

In another aspect combinable with any of the previous aspects, the first insert and the second insert each include a metal.

In another aspect combinable with any of the previous aspects, the first insert and the second insert each include a nylon reinforced fiberglass.

In another aspect combinable with any of the previous aspects, the first deformable structure and the second deformable structure each include a rubber material.

In another example implementation, a refuse grabber assembly includes a grabber arm that is operable to engage a refuse container. The grabber arm includes a gripper and a support arm coupled to the gripper. The gripper includes deformable structure configured to contact a surface of the refuse container, the deformable structure defining a lattice with internal webs that buckle during gripping.

In an aspect combinable with the example implementation, the deformable structure includes a plurality of openings, wherein at least one opening of the plurality of openings is configured to collapse in response to application of a threshold amount of force to a surface of the deformable structure.

In another aspect combinable with any of the previous aspects, the at least one opening of the plurality of openings is configured to collapse in order to conform the surface of the deformable structure to the surface of the refuse container.

In another aspect combinable with any of the previous aspects, each of the plurality of openings are triangular shaped.

In another aspect combinable with any of the previous aspects, the gripper further includes an insert, and the deformable structure surrounds and is coupled to the insert.

In another aspect combinable with any of the previous aspects, the insert includes a plurality of openings therethrough.

In another aspect combinable with any of the previous aspects, at least one of the plurality of openings through the insert is configured to receive a respective fastener.

In another aspect combinable with any of the previous aspects, the refuse grabber assembly includes a plurality of fasteners configured to couple the gripper to the support arm.

In another aspect combinable with any of the previous aspects, the gripper is coupled to the insert through at least one opening of the plurality of openings in the insert.

In another aspect combinable with any of the previous aspects, the insert includes a metal.

In another aspect combinable with any of the previous aspects, the insert includes a nylon reinforced fiberglass.

In another aspect combinable with any of the previous aspects, the deformable structure includes a rubber material.

In another aspect combinable with any of the previous aspects, a surface of the deformable structure includes a texture.

In another aspect combinable with any of the previous aspects, at least two of the internal webs have adjacent ends and are non-parallel.

In another aspect combinable with any of the previous aspects, the grabber arm is a first grabber arm; the gripper is a first gripper; the deformable structure is a first deformable structure; the support arm is a first support arm; the surface of the refuse container is a first surface of the refuse container; and the refuse grabber assembly includes a second grabber arm opposite the first grabber arm and operable to engage the refuse container, wherein the first grabber arm and the second grabber arm cooperate to engage the refuse container. The second grabber arm includes a second gripper and a second support arm coupled to the second gripper. The second gripper includes a second deformable structure configured to contact a second surface of the refuse container.

In another aspect combinable with any of the previous aspects, the refuse grabber assembly is coupled to a refuse collection vehicle. The refuse collection vehicle includes a lift arm coupled to the refuse grabber assembly, the lift arm operable to position the refuse grabber assembly; and a hopper configured to receive refuse from the refuse container.

In another aspect combinable with any of the previous aspects, the second deformable structure includes a plurality of openings, wherein at least one opening of the plurality of openings is configured to collapse in response to application of a threshold amount of force to the second surface of the second deformable structure.

In another aspect combinable with any of the previous aspects, each of the plurality of openings in the second deformable structure are triangular shaped.

In another aspect combinable with any of the previous aspects, the second gripper includes a second insert, and the second deformable structure surrounds and is coupled to the second insert.

In another aspect combinable with any of the previous aspects, the second insert includes a plurality of openings therethrough.

In another aspect combinable with any of the previous aspects, at least one of the plurality of openings through the second insert is configured to receive a respective second fastener.

In another aspect combinable with any of the previous aspects, the refuse grabber assembly includes a plurality of fasteners configured to couple the second gripper to the second support arm.

In another aspect combinable with any of the previous aspects, the second insert is coupled to the second gripper through at least one opening of the plurality of openings through the second insert.

In another aspect combinable with any of the previous aspects, the second insert includes a metal.

In another aspect combinable with any of the previous aspects, the second insert includes a nylon reinforced fiberglass.

In another aspect combinable with any of the previous aspects, the second deformable structure includes a rubber material.

Potential benefits of the one or more implementations described in the present specification may include increased waste collection efficiency and reduced operator error in refuse collection. For example, the grabber assembly described herein can engage refuse containers of multiple different sizes without requiring adjustment of the opening distance between the grabber arms. The one or more implementations may also reduce the likelihood of damaging refuse containers and refuse collection vehicles during the refuse collection process. For example, the deformable structure of the grabber assembly described herein may help prevent damage to the refuse container during collection of refuse from the refuse container by the refuse collection vehicle. The one or more implementations may also reduce the risk of injury to refuse collection vehicle operators by reducing the need for the operators to exit the vehicle to physically interact with the refuse containers as the grabber arm of the implementations described herein can accommodate a wider range of sizes of refuse containers without requiring manual adjustment of the grabber arm opening or closing distances. For example, the grabber assembly described herein can accommodate refuse containers of multiple different sizes without requiring movement of mechanical parts to adjust a distance between grabber arms. In addition, the grabber assembly described herein is easy to install and replace. The grabber assembly described herein ensures that refuse cans of various sizes can be firmly gripped throughout an entire dump cycle.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the subject matter described in this disclosure are set forth in the accompanying drawings and the description below. Other features, objects, and advantages of the subject matter will be apparent from the description and drawings, and from the claims.

DESCRIPTION OF DRAWINGS

Like reference numbers and designations in the various drawings indicate like elements.

DETAILED DESCRIPTION

Figure 1:
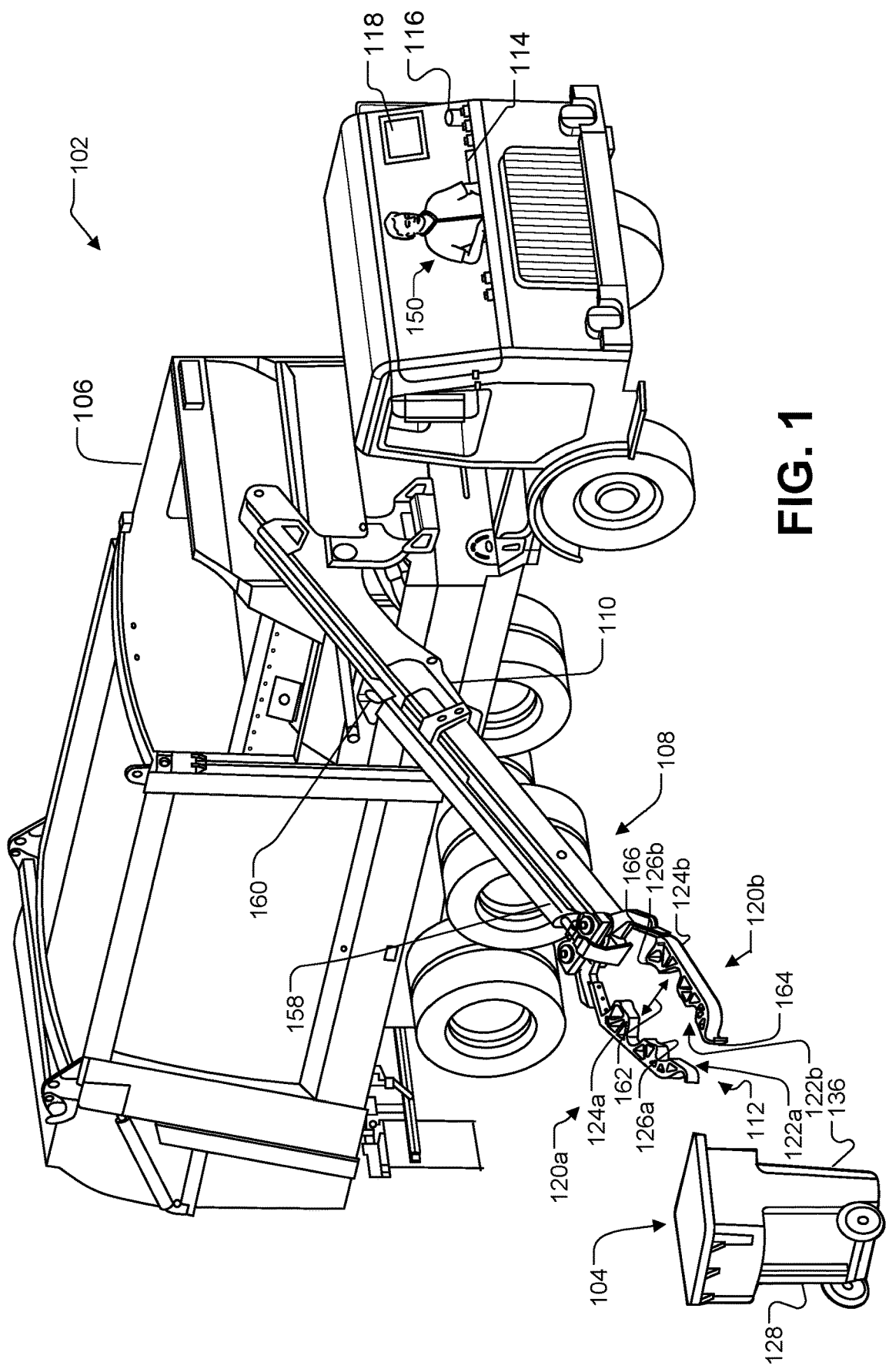
FIG. 1 depicts an example refuse collection vehicle.

FIG. 1 depicts an example vehicle for collecting refuse. Vehicle 102 is a refuse collection vehicle that operates to collect and transport refuse (e.g., garbage and/or recycling). The refuse collection vehicle 102 can also be described as a garbage collection vehicle, or garbage truck. The vehicle 102 is configured to lift a container 104 that contains refuse, to empty refuse in the container 104 into a hopper 106 of the vehicle 102, and to enable transporting the refuse to a collection site, compacting of the refuse, and/or other refuse handling activities.

The body components of the vehicle 102 can include various components that are appropriate for the particular type of vehicle 102. For example, the vehicle 102 has an automated side loader (ASL) 108, as shown in FIG. 1. Alternatively, the vehicle may be a front-loading truck, a rear loading truck, a roll off truck, or some other type of garbage collection vehicle. A vehicle with an ASL, such as the example shown in FIG. 1, may include body components involved in the operation of the ASL, such as an arm and/or grabbers, as well as other body components such as a pump, a tailgate, a packer, and so forth. A front-loading vehicle may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the vehicle, and/or expel the garbage from the vehicle.

Referring to FIG. 1, the ASL 108 of vehicle 102 includes a lift arm 110 and a grabber assembly 112 operable to grab the refuse container 104, lift the refuse container 104 from the ground, empty the refuse container 104 into the hopper 106, and place the refuse container 104 back on the ground. Referring to FIG. 1, the refuse container 104 can be engaged by the grabber assembly 112 of the refuse collection vehicle 102. The grabber assembly 112 includes a grabber arm 120a and a grabber arm 120b that cooperate to apply pressure to the refuse container 104 in order to engage the refuse container 104.

A lift arm 110 is coupled to the grabber assembly 112 and controls the position of the grabber assembly 112. The lift arm 110 has a cylinder 158 and a piston 160 that work together to move the grabber arms 120a, 120b between an open position (not shown) to a closed or grabbing position (as depicted in FIG. 1). For example, extension of the piston 160 from the cylinder 158 will cause the grabber arms 120a, 120b to move inward to reduce the distance 162 between the grabber arms 120a, 120b. Retraction of the piston 160 into the cylinder 158 causes the grabber arms 120a, 120b to move outward and increase the distance 162 between the grabber arms 120a, 120b. The distance 162 between the grabber arms 120a, 120b in the closed position is a set distance that can be manually or automatically adjusted prior to performing the dump cycle (e.g., during production). In some implementations, the distance 162 between the grabber arms 120a, 120b in the closed position is between 9 inches and 10 inches. In some implementations, the distance 162 between the grabber arms 120a, 120b in the closed position is a set distance that is optimized based on the specific configuration of the grippers 122a, 122b. The cylinder 158 coupled to the grabber assembly 112 can be configured to control the distance 162 between the grabber arms 120a, 120b throughout a dump cycle.

The vehicle 102 can include an onboard computing device 114 to manage, monitor, and/or operate various body components of the vehicle 102. The onboard computing device 114 can be connected to multiple sensors (not shown) in the vehicle 102. The onboard computing device 114 can transmit one or more signals over a network or wiring on the vehicle 102 when the onboard computing device 114 senses a state change from any of the sensors. The vehicle 102 can include a display 118 in the cab of the vehicle to display images and/or video received from one or more cameras (not shown) positioned on the vehicle 102. For example, display 118 can be used to monitor image and/or video data of the vehicle components engaging and servicing the refuse container 104.

As depicted in FIG. 1, one or more controls 116 are provided to control mechanical components of the vehicle 102. For example, controller 116 can be used to control movement of the lift arm 110 and the grabber assembly 112 to engage and service a refuse container 104. The controller 116 can be communicably coupled to the onboard computing device 114 to send signals to the onboard computing device 114 and receive signals from the onboard computing device 114 that are used to control the operation of the lift arm 110 and the grabber assembly 112. In some implementations, an operator 150 of the vehicle 102 uses one or more of the controls 116 to control the grabber assembly 112 to engage the refuse container 104

As previously discussed, the grabber assembly 112 includes the grabber arm 120a and the grabber arm 120b that cooperate with one another in order to engage a refuse container 104. As can be seen in FIG. 1, the grabber arm 120a includes a gripper 122a that is coupled to a support arm 124a of the grabber arm 120a. The gripper 122a includes a deformable structure 126a. The deformable structure 126a is arranged on the support arm 124a to contact a surface 128 of the refuse container 104 when the refuse container 104 is being engaged by the grabber assembly 112. As will be discussed in further detail herein, the deformable structure 126a includes openings that allow the deformable structure 126a to deform or collapse to accommodate a refuse container contacting the deformable structure 126a.

Referring to FIG. 1, in some examples, the grabber assembly includes a second grabber arm 120b arranged to oppose the first grabber arm 120a and the second grabber arm 120b is in all respects identical to the first grabber arm 120a but being mirrored about a vertical plane. The grabber arm 120b includes a gripper 122b coupled to a support arm 124b of the grabber arm 120b. In some examples, the second grabber arm 120b includes a gripper 122b that is in all respects identical to gripper 122a of the first grabber arm 120a but being mirrored about a vertical plane. For example, similar to gripper 122a, gripper 122b has a deformable structure 126b that is configured to contact a surface 136 of the refuse container 104 when the refuse container 104 is being engaged by the grabber assembly 112. As with gripper 122*a*, deformable structure 126*b* includes openings discussed in further detail herein that allow the deformable structure 126*b* to deform or collapse to accommodate a refuse container contacting the deformable structure 126*b*.

The gripper 122*a* and the gripper 122*b* are configured to contact surfaces (surface 128 and surface 136) on opposite sides of the refuse container 104 to grip the refuse container 104 without crushing, collapsing, or otherwise damaging the refuse container 104. In particular, the design of the deformable structure 126*a*, 126*b* on each grabber arm 120*a*, 120*b* causes the deformable structure 126*a*, 126*b* to collapse in response to a threshold amount of pressure, which provides additional room and accommodates the refuse container between the grabber arms 120*a*, 120*b*. For example, when the grabber arms 124*a*, 124*b* are moved into a closed position around a refuse container 104, the grippers 122*a*, 122*b* contact the refuse container 104. When the width of the refuse container being engaged by the grabber assembly 112 is larger than the distance 162 between the grabber arms 120*a*, 120*b*, the deformable structure 126*a*, 126*b* of each of the grippers 122*a*, 122*b* can deform or collapse to accommodate the refuse container 104 without crushing or collapsing the refuse container. Crushing or collapsing the refuse container 104 can cause spills the refuse contained in the refuse container 104 and/or permanently damage the refuse container 104.

The deformable structures 126*a*, 126*b* each have an overall structural stiffness which is less stiff than the stiffness of the respective surface of the refuse container 104 that the deformable structure 126*a*, 126*b* is engaging due to the stiffness of the material forming the deformable structure 126*a*, 126*b* and the lattice of internal webs formed by the openings within each of the deformable structures 126*a*, 126*b*. As a result, when the deformable structure 126*a*, 126*b* engages the refuse container 104, the refuse container applies a force above a threshold amount on the deformable structure 126*a*, 126*b*, the deformable structure 126*a*, 126*b* collapses, in part or in whole, in order to continue to engage the refuse container 104 without crushing the refuse container 104. In some implementations, the material forming the deformable structures 126*a*, 126*b* has a stiffness in a range of 60 to 90 on the Shore A scale. In some examples, the deformable structure 126*b* can be made of one or more of a rubber material, a polyurethane material, or smart or reactive materials (e.g., silicone, piezoelectric materials, or shape-memory materials). For example, in some implementations, the deformable structure 126*b* is made of styrene butadiene rubber.

Figure 2A:
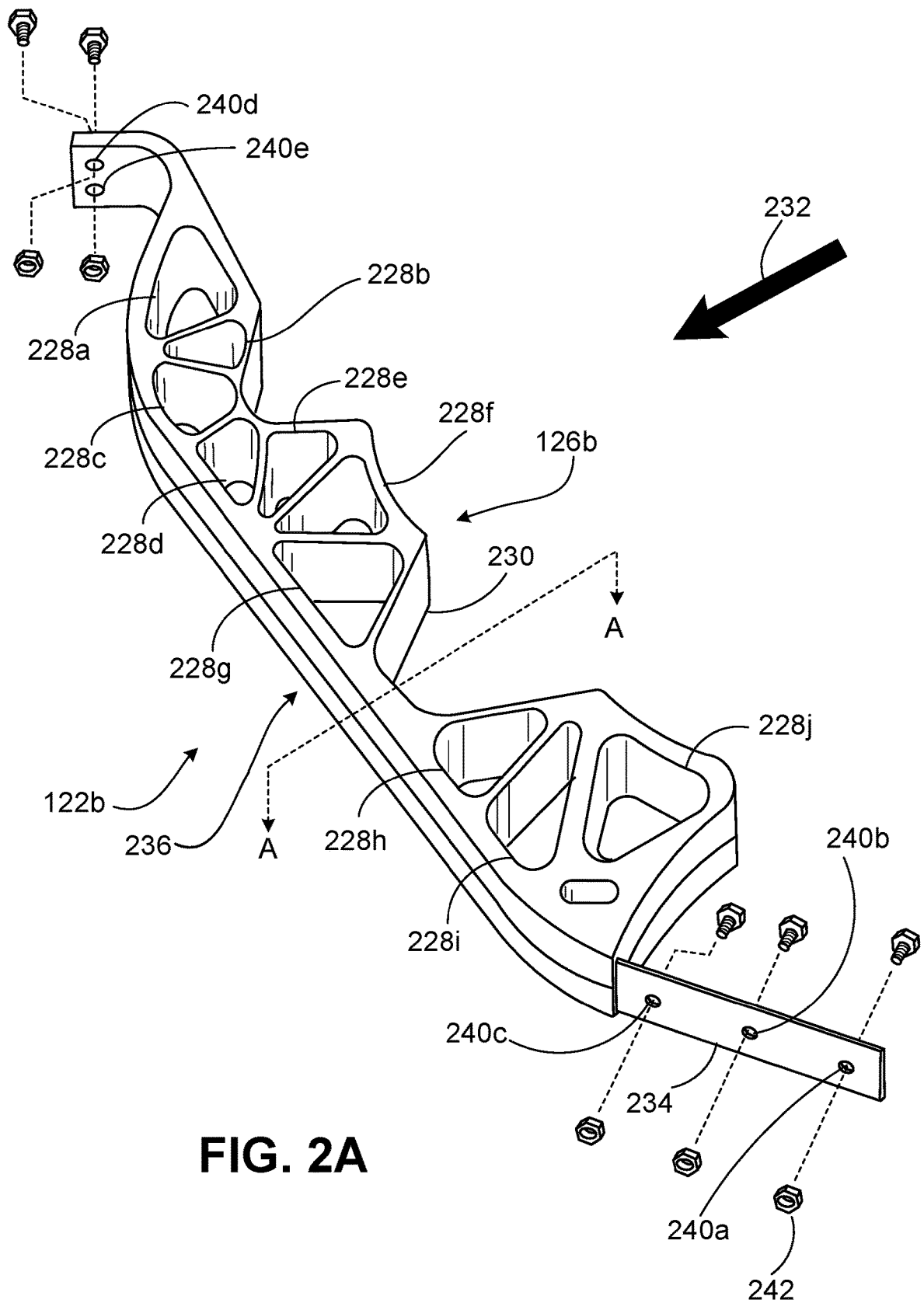
FIG. 2A depicts a perspective view of the example deformable gripper of FIG. 1.
Figure 2B:
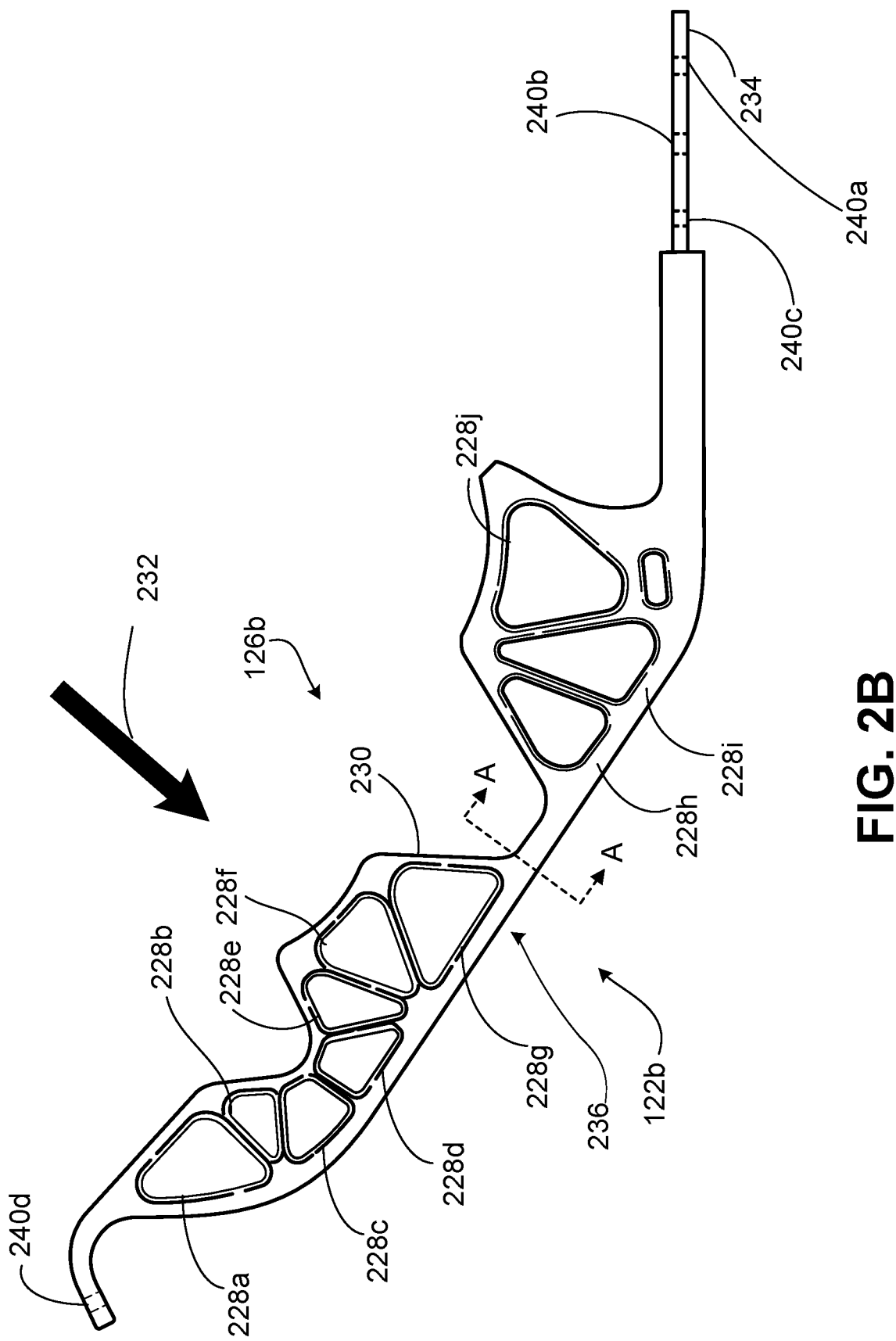
FIG. 2B depicts a top view of the example deformable gripper of FIG. 2A.

FIG. 2A depicts a perspective view of the example deformable gripper 122*b* of FIG. 1 and FIG. 2B depicts a top view of the example deformable gripper of FIG. 2A. As shown in FIGS. 2A and 2B, the deformable structure 126*b* has multiple openings 228*a*, 228*b*, and 228*c*, 228*d*, 228*e*, 228*f*, 228*g*, 228*h*, 228*i*, and 228*j* through the deformable structure 126*b*. As can be seen in FIG. 2B, the openings 228*a-j* through the deformable structure 126*b* define a lattice of internal webs within the deformable structure 126*b*. The webs formed by the openings 228*a-j* in the deformable structure 126*b* are configured to buckle and collapse when a force above a threshold force is applied to the deformable structure 126*b*, such as during gripping a refuse container. For example, the internal web of the lattice structure defined by openings 228*h-j* deforms when a threshold amount of force is applied to the surface 230 of the deformable structure 126*b* in the direction of arrow 232 when gripping a refuse container 104. When the deformable structure 126*b* collapses or otherwise deforms during engagement of a refuse container 104, the surface 230 continues to grip the refuse container 104 as the force is applied to surface 230 by the refuse container. This lattice formed by the openings 228*a-j* through the deformable structure 126*b* allows for a significant deformation of the deformable structure 126*b*, while keeping the surface 230 that contacts the refuse container 104 stiff enough to continue to engage and grip the refuse container 104.

The internal lattice formed by the openings 228*a-j* in the deformable structure 126*b* is sufficiently resilient and durable to allow the deformable structure 126*b* to be repeatedly deformed and re-expanded over many refuse collection cycles. As such, once the force causing the internal lattice of the deformable structure 126*b* to buckle and the openings 228*a-j* to collapse is removed, the openings 228*a-j* in the deformable structure expand and the internal lattice of the deformable structure 126*b* returns to its original, expanded (uncollapsed) state, as depicted in FIGS. 2A and 2B. For example, once the refuse container 104 engaged by the deformable structure 126*b* that is applying a threshold amount of force to the surface 230 of the deformable structure 126*b* is released from the grabber assembly 112, the openings 228*a-j* in the deformable structure expand and the internal lattice of the deformable structure 126*b* returns to its original, expanded (uncollapsed) state, as depicted in FIGS. 2A and 2B.

As noted above, the openings 228*a-j* are each configured to collapse in response to application of a respective threshold amount of a force to a surface 230 of the deformable structure 126*a*. For example, when the grabber assembly 112 is operated to engage a refuse container 104, the gripper 122*b* contacts the refuse container 104 and a force is applied to the surface 230 of the deformable structure 126*b* of the gripper 122*b* by the surface 128 of the refuse container 104 in the direction of arrow 232. As will be described in further detail herein, in some implementations, the force applied to the surface 230 of the gripper 122*b* by the refuse container 104 exceeds a threshold force when the distance 162 between the grabber arms 120*a*, 120*b* is reduced as the grabber assembly 112 moves to the closed position (for example, due to a large size of the refuse container 104), which can cause one or more openings 228*a* through the deformable structure 126*a* to collapse in order to better accommodate the refuse container 104.

In some implementations, a different level of force is required to collapse different portions of the deformable structure 126*b*. For example, as depicted in FIG. 2B, the differing sizes of the various opening 228*a-j* results in different thicknesses in the internal webs formed in the deformable structure 126*b*. As a result in this difference in cross-sectional thickness of the internal webs formed by the openings 228*a-j*, different portions of the deformable structure 126*b* require a different level of force to be applied to in order to collapse. For example, portions of the lattice of internal webs formed by the openings 228*a-j* having a thicker cross sectional width better maintain their shape and better resist shear force compared to areas with a thinner cross sectional width. As a result, portions of the lattice of internal webs having a thicker cross sectional width will require a different (e.g., higher) level of force application to collapse compared to areas with a thinner cross sectional width. As such, application of a force to the deformable structure 126*b* can result in some, but not all, portions of the deformable structure 126*b* to collapse. For example, as will be described in detail herein, the force applied to the deformable structure 126*b* when the grabber assembly 112 engages a large refuse container may result in collapse of a greater number of openings 228a-j (or a more complete collapse of the same number of openings 228a-j) in the deformable structure 126b compared to when the grabber assembly 122 is engaging a smaller refuse container.

In some cases, the surface 230 of deformable structure 126b is textured to further improve the grip of the gripper 122b on the refuse container 104. In some implementations, the texture on the surface 230 of the deformable structure 126b is configured to improve the grip of the refuse container 104 based on the material used to form the surface of the refuse container 104 contacting the grippers 122a, 122b.

Figure 2C:
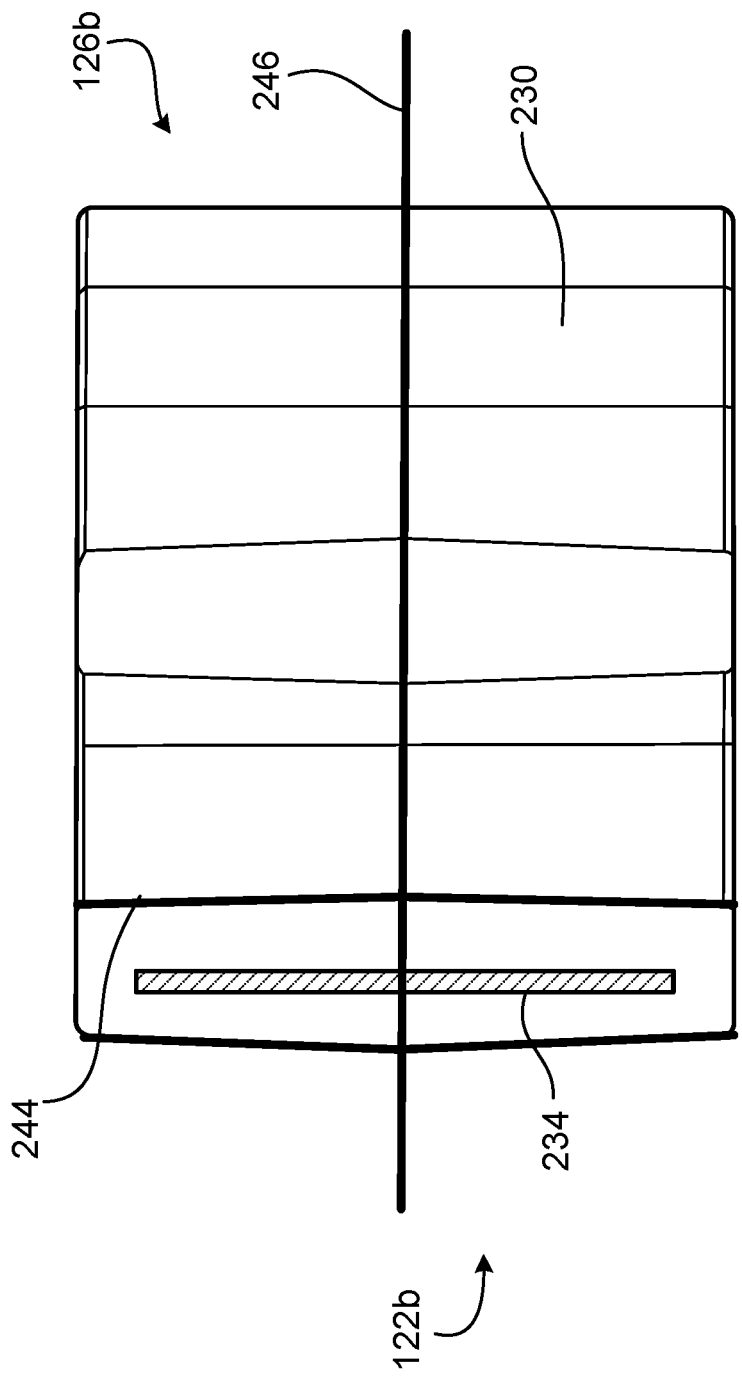
FIG. 2C depicts a cross-sectional view of the example deformable gripper of FIG. 2A.

Still referring to FIG. 2A, the gripper 122b includes an insert 234 positioned within and coupled to the deformable structure 126b of the gripper 122b. For example, FIG. 2B depicts a cross-sectional view of the gripper 122b of FIG. 2A along the cross-section A-A, and, as shown in FIG. 2C, the insert 234 is surrounded by and coupled to the deformable structure 126b of the gripper 122a. In some implementations, the insert 234 is shaped to conform to the shape of the support arm 124b of FIG. 1. A portion 244 of the deformable structure 126b surrounding the insert 234 is angled away from a centerline 246 of the deformable structure 126b and the insert 234. In other implementations, the surface 230 of the deformable structure 126b need not be angled away from the centerline 246. The insert 234 supports the deformable structure 126b and couples the deformable structure 126b to the support arm 124b, for example, as depicted in FIG. 2A.

In some implementations, the insert 234 is straight. For example, all portions of the insert 234 can be parallel. In some implementations, the insert 234 includes one or more portions that are not parallel. For example, as depicted in FIG. 2D, opposite ends 248, 250 of the insert 234 can be inclined (bent) towards one another, causing end portions 252, 254 of the insert 234 to curve inward towards a center portion 256 of the insert 234.

Referring to FIG. 2A, the gripper 122b has a surface 236 opposite the surface 230 in contact with the support arm 124b, as shown in FIG. 1. The gripper 122b can be mechanically coupled to the support arm 124b, as described later in reference to FIGS. 2D and 3.

Figure 2D:
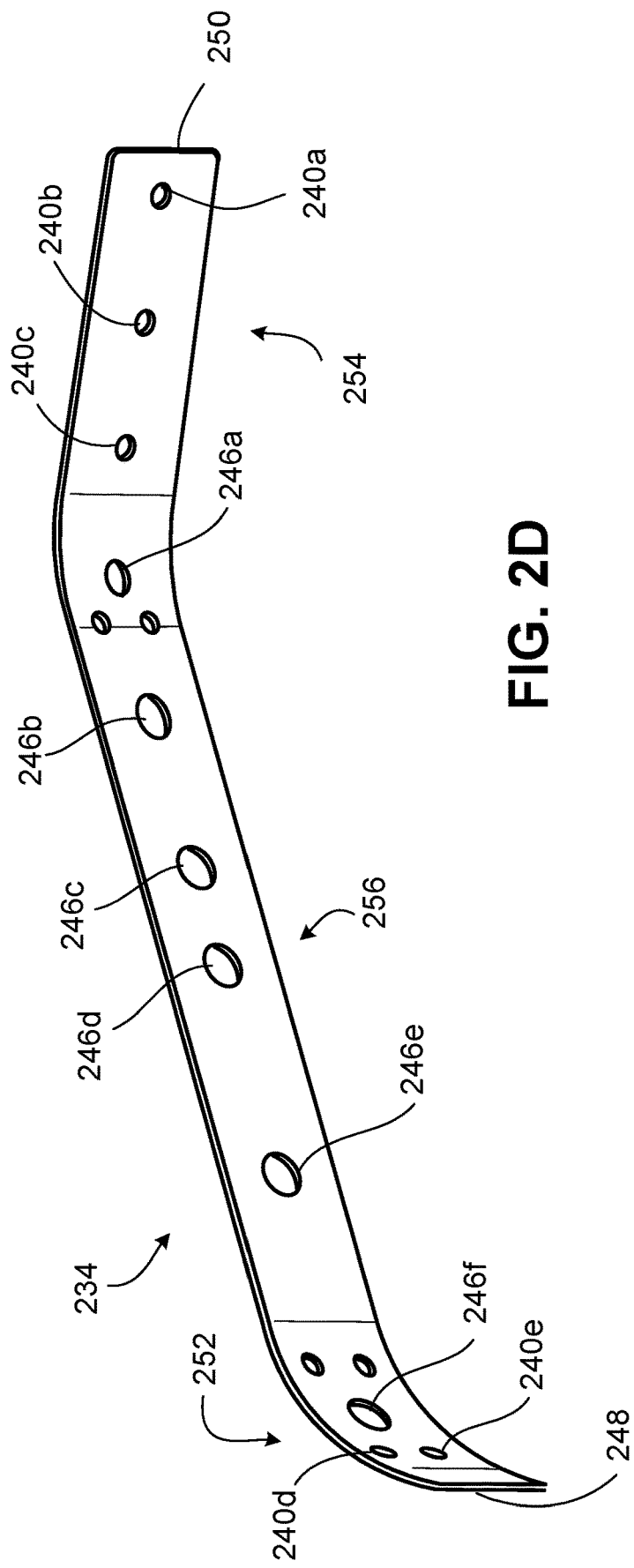
FIG. 2D depicts a perspective view of an insert of the deformable gripper of FIG. 2A.

As can be seen in FIGS. 2A and 2D, the insert 234 has multiple openings 240a, 240b, 240c, 240d, and 240e that are configured to accept fasteners 242 that couple the gripper 122b to the grabber arm 120b. For example, fasteners 242 can be inserted through the openings 240a-e in the insert 234 and corresponding openings in the support arm 124b to couple the gripper 122b to the support arm 124b. The fasteners 242 can be bolts and nuts, as shown in FIG. 2A. Any suitable type of fastener can be used to couple the gripper 122b to the support arm 124b, including, but not limited to, threaded fasteners and clamping brackets. In some implementations, the fasteners 242 are placed inside a mold used to form the deformable structure 126b and the material used to form the deformable structure 126b flows around and encases at least a portion of the fasteners 242 during the process of molding the deformable structure 126b.

Referring to FIG. 2D, the insert 234 also includes one or more openings 246a, 246b, 246c, 246d, 246e, 246f that are configured to be filled with the material of the deformable structure 126b (e.g., rubber) during the process of molding the deformable structure 126b over the insert 234. As will be explained in further detail herein, by flowing and curing the material used to form the deformable structure 126b within the openings 246a, 246b, 246c, 246d, 246e, 246f in the insert 234, the insert 234 is coupled to the deformable structure 126b.

The insert 234 is constructed from a rigid material to provide structural rigidity to the deformable structure 126b and aid in coupling the gripper 122b to the support arm 124b. For example, the insert 234 can made of one or more metals, such as steel or aluminum, and/or a composite material, such as nylon reinforced fiberglass, or a rubber material.

In some implementations, the gripper does not includes an insert and the gripper is coupled to the support arm 124 without the use of an insert.

Figure 3:
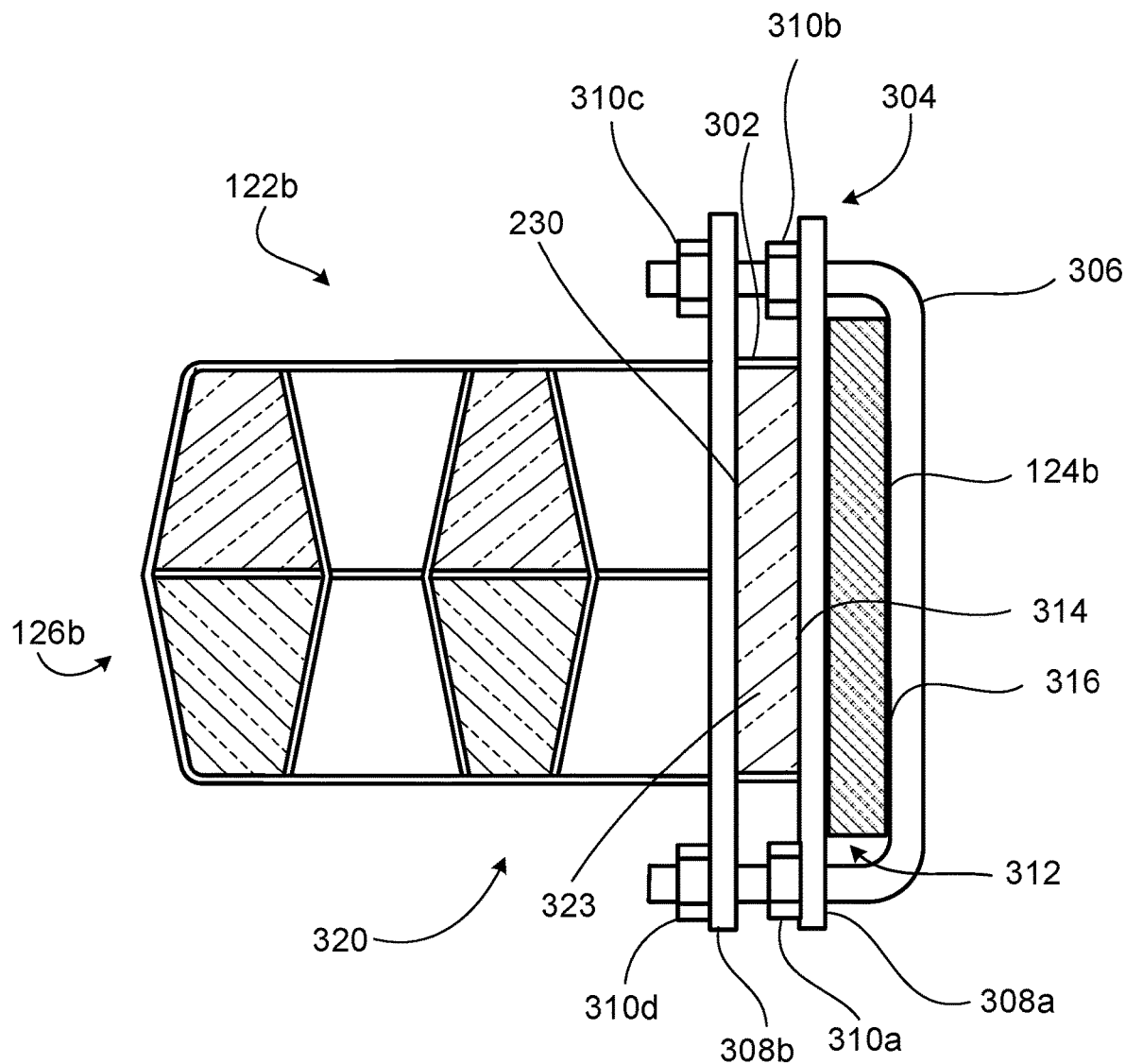
FIG. 3 depicts a front view of another example deformable gripper.

Further, while the grippers 122a, 122b have been described as being coupled to the grabber arms 120a, 120b using nuts and bolts, other fastening mechanisms can be used to couple the grippers 122a, 122b to the respective grabber arms 120a, 120b. For example, FIG. 3 depicts a front view of the gripper 122a. Referring to FIG. 3, the gripper 122a includes a deformable structure 126a coupled to the support arm 124a. As can be seen in FIG. 3, the gripper 122a includes a fastener assembly 304 which passes around a portion 302 the deformable structure 126a and the support arm 124 to couple the gripper 122a to the support arm 124a. The fastener assembly 304 includes a U-bolt 306, clamping bars 308a, 308b, and multiple nuts 310a, 310b, 310c, 310d.

Implementations can include two or more U-bolts 306. For example, in some implementations, three or four clamping type fasteners 206 (e.g., U-bolts) can be used to fasten each gripper 122a, 122b to the respective grabber arm 120a, 120b, including a clamping type fastener positioned at each end of the grabber arm 120a, 120b and one or two clamping type fasteners positioned along the length of the grabber arm 120a, 120b between the ends of the grabber arm 120a, 120b. Likewise, implementations can include only one clamping bar 308, or three, four, or more clamping bars 308a.

The U-bolt 306 can be placed with an opening 312 of the U-bolt 306 facing towards the support arm 124b and the deformable structure 126b, e.g., with the opening 312 of U-bolt 306 touching the support arm 124b. The clamping bar 308a slides onto the U-bolt 306 and contacts the support arm 124b, positioning the support arm 124b between U-bolt 306 and clamping bar 308a. The clamping bar 308a is locked to the U-bolt 306 by the nuts 310a and 310b, coupling the U-bolt 306 to the support arm 124b. A portion of the gripper 122b is placed within the opening 312 of the U-bolt 306 between clamping bars 308a and 308b, and the clamping bar 308b slides on the U-bolt 306. The clamping bar 308b is locked to the U-bolt 306 by the nuts 310c and 310d, coupling the U-bolt 306 to the gripper 122b and the support arm 124b. In some implementations, one of clamping bars 308b is placed through one of the openings 228a-j in the deformable structure 126b and the other clamping bar 308a is positioned on a back surface 314 of the deformable structure 126b adjacent the selected opening 228a-j. The clamping bars 308a, 308b apply pressure to the rubber wall 323 between the opening 228a-j and the back surface 314 of the deformable structure 126b. An outside surface 316 of the U-bolt 306 surrounds the support arm 124b.

Alternatively or additionally, the U-bolt 306 can be placed with the opening 312 of the U-bolt 306 facing towards the deformable structure 126b, e.g. with the opening 312 of the U-bolt 306 touching the deformable structure 126b without use of the clamping bar 308a. In this arrangement, the gripper 122b is placed in the opening 312 of the U-bolt 306 and the clamping bar 308b slides on the U-bolt 306 and contacts the outer surface of the support arm 124b. The clamping bar 308b is locked to the U-bolt 306 by the nuts 310c and 310d, coupling the U-bolt 306 to the gripper 122b and the support arm 124b.

An example process of servicing a refuse container 104 using the vehicle 102 will now be described in reference to FIGS. 1, 4A, 4B, 5A, and 5B.

In order to service a refuse container, an operator 150 of the vehicle 102 positions the vehicle 102 proximate the refuse container 104 to be serviced. Once the vehicle 102 is positioned proximate the refuse container 104 to be serviced, the lift arm 110 can be controlled to position the grabber assembly 112 proximate the refuse container 104 in order to engage the refuse container 104. For example, the lift arm 110 can extend the grabber assembly 112 outward from the vehicle 102 until the grabber assembly 112 is in a position to engage the refuse container 104. Once the grabber assembly 112 is in close proximity to the refuse container 104, a distance 162 between the grabber arms 120a, 120b is adjusted in order to engage and apply pressure to the refuse container 104. For example, in some implementations, the grabber arms 120a, 120b are moved from an open position inwards towards one another and the distance 162 between the grabber arms 120a, 120b is continually reduced until the grabber arms 120a, 120b are in a closed position. In some implementations, the grabber arms 120a, 120b are moved into one predetermined closed position (with a distance 162 between the grabber arms 120a, 120b) without having to monitor the pressure applied to the refuse container 104. Depending on the size of the refuse container 104, engaging the refuse container 104 with the grabber assembly 112 in the closed position can result in application of pressure on the grippers 122a, 122b of the grabber arms 120a, 120b above a threshold amount of pressure, causing the deformable structure 126a, 126b of the grippers 122a, 122b to deform or collapse, as depicted in FIG. 4B.

Figure 4A:
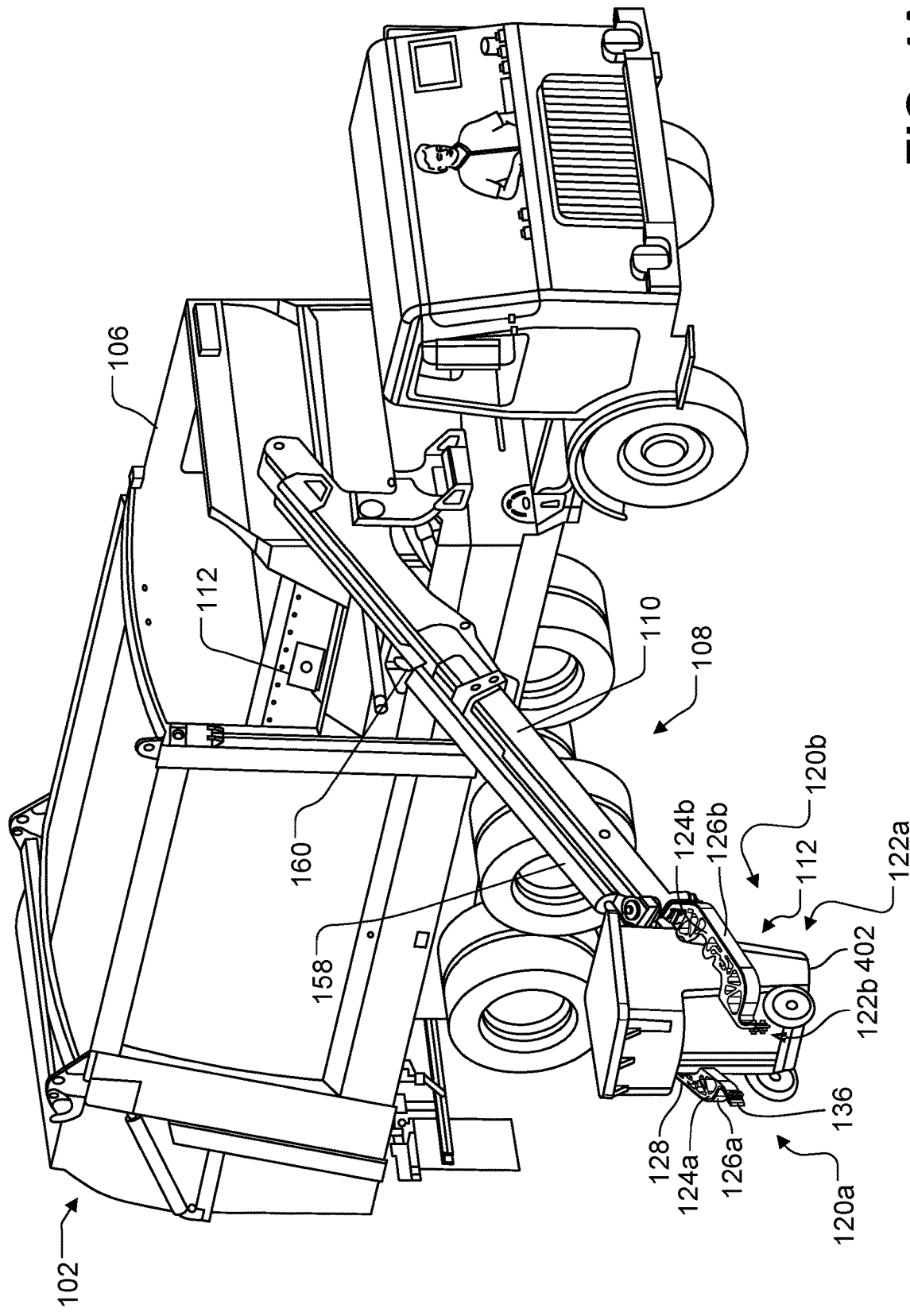
FIG. 4A depicts the refuse collection vehicle of FIG. 1 with the grabber assembly engaging a small refuse container.
Figure 5A:
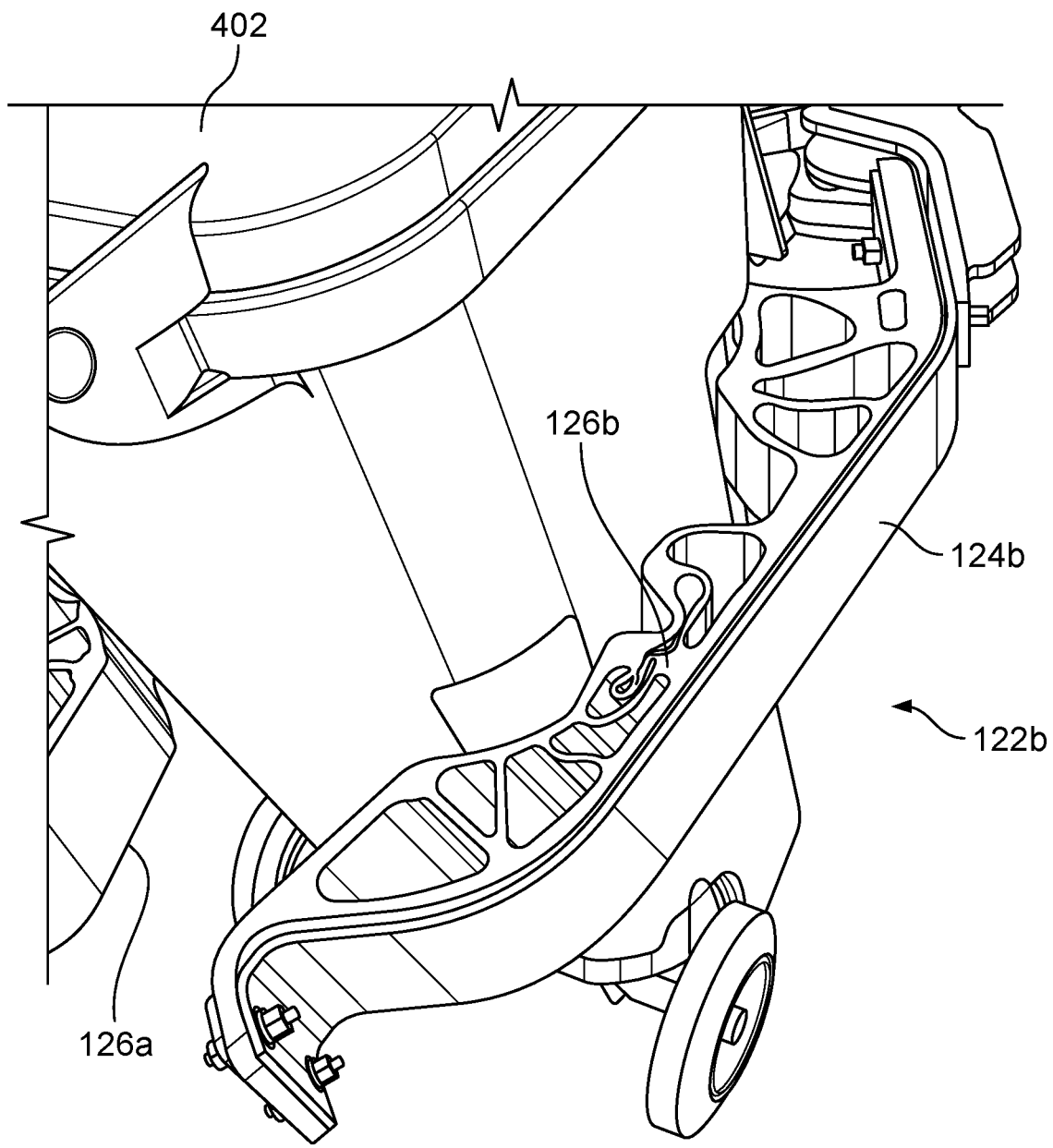
FIG. 5A depicts a perspective view of the grabber assembly engaging the small refuse container of FIG. 4A.

For example, FIGS. 4A and 5A depict the refuse collection vehicle 102 of FIG. 1 with the grabber assembly 112 engaging a small refuse container 402. When the grabber assembly 112 engages a refuse container 402 that has a width that is similar to the distance 162 between the grabber arms 120a, 120b in the closed position, the refuse container 402 fits between the grabber arms 120a, 120b without the surface of the refuse container 402 applying much force (e.g., less than a threshold amount of force) to the grippers 122a, 122b. As a result, the deformable structure 126a, 126b of the grippers 122a, 122b may not fully collapse when gripping a refuse container 402 having a width similar to the distance 162 between the grabber arms 120a, 120b in the closed position. Rather, the deformable structure 126a, 126b of the grippers 122a, 122b maintains its structural rigidity and grips the small refuse container 402 without deforming or only slightly deforming or crushing the small refuse container 402.

Figure 4B:
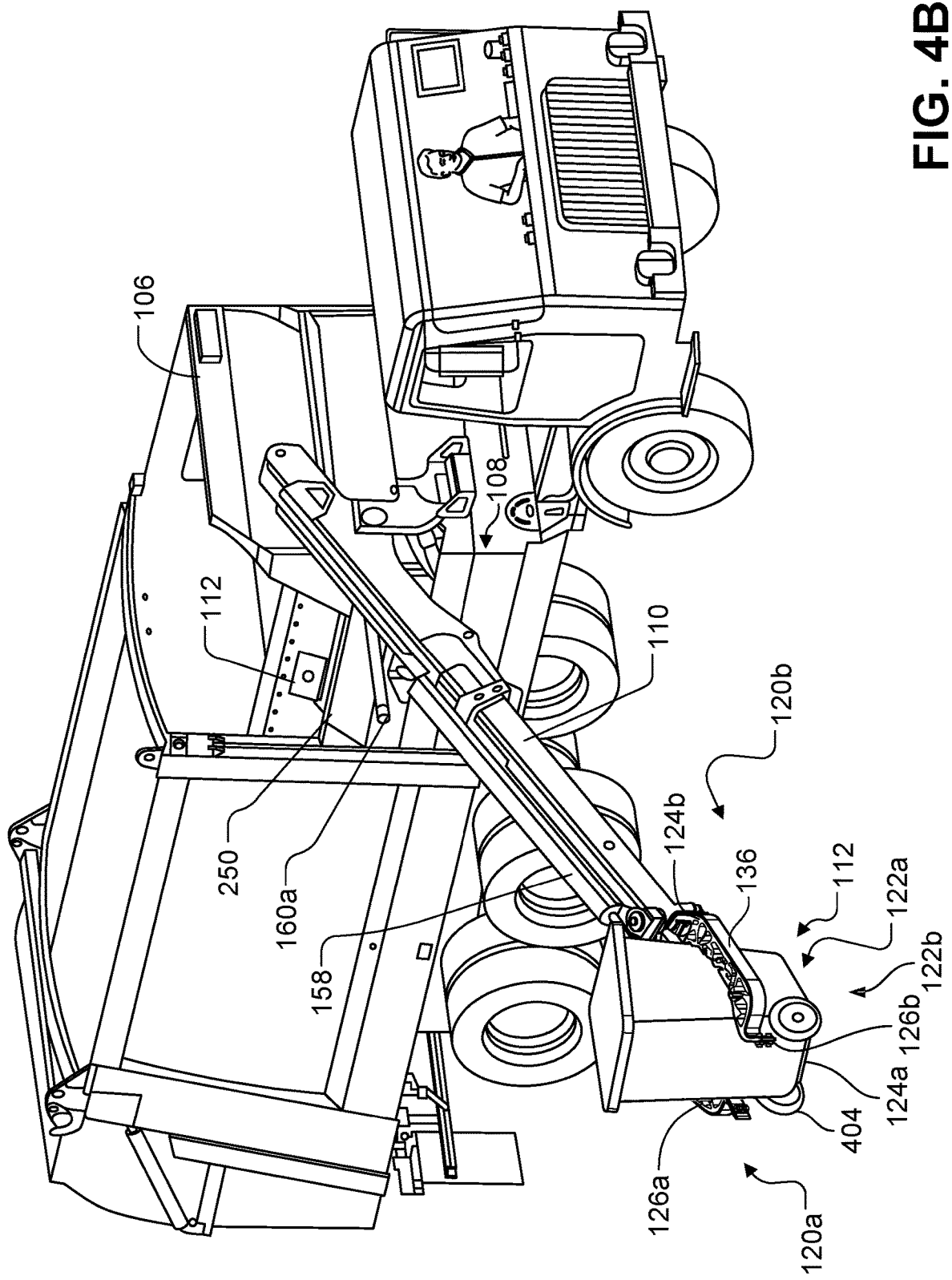
FIG. 4B depicts the refuse collection vehicle of FIG. 1 with the grabber assembly engaging a large refuse container.
Figure 5B:
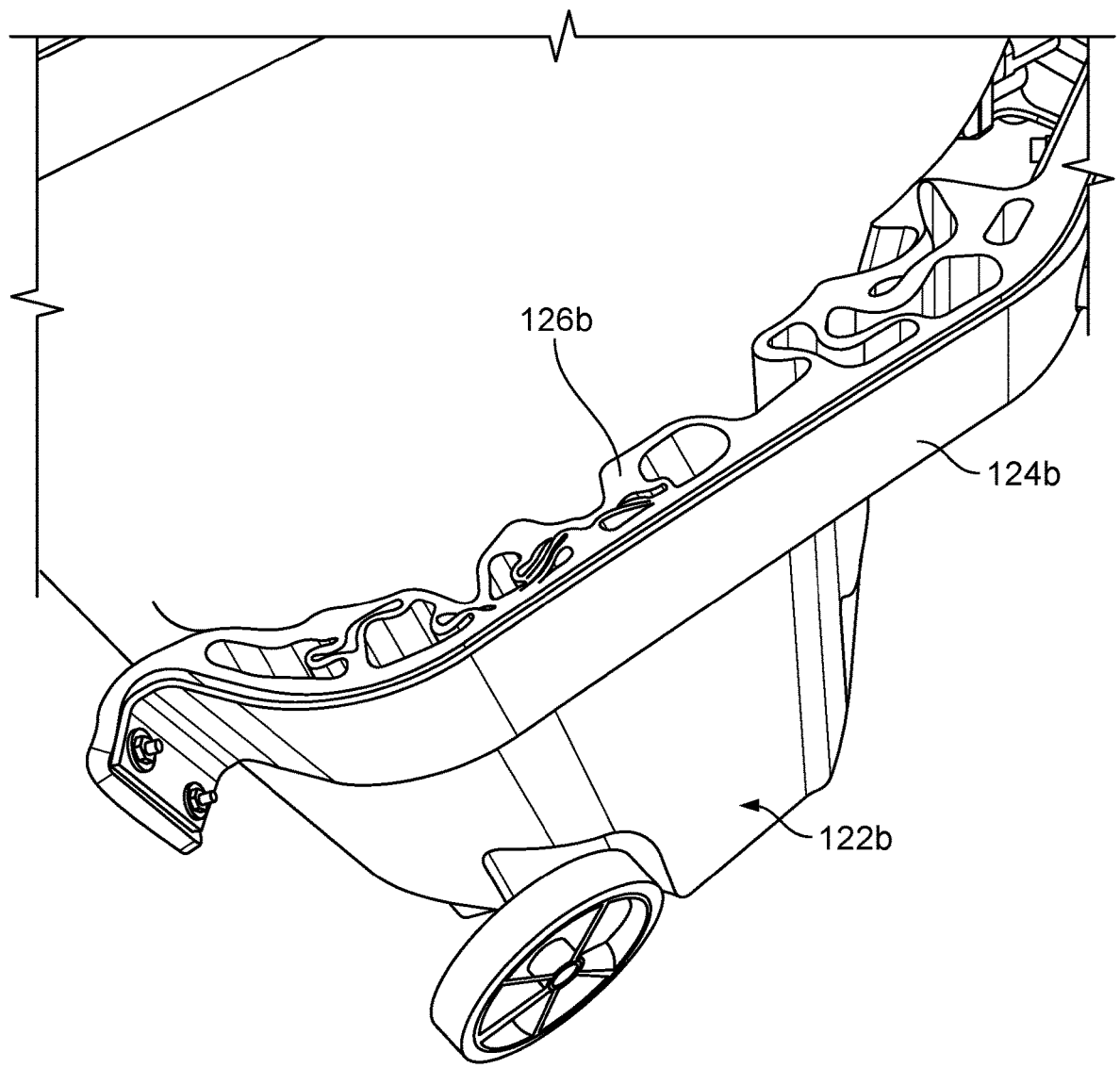
FIG. 5B depicts a perspective view of the grabber assembly engaging the large refuse container of FIG. 4B.

In contrast, FIGS. 4B and 5B depict the refuse collection vehicle 102 of FIG. 1 with the grabber assembly grabbing a refuse container 404 that has a width that is larger than the distance 162 between the grabber arms 120a, 120b in the closed position. When the grabber assembly 112 grabs the large refuse container 404 with a width that is larger than the distance 162 between the grabber arms 120a, 120b in the closed position, the surface of refuse container 404 applies a force to the grippers 122a, 122b on the grabber arms 120a, 120b (e.g., more than a threshold amount of force) as the grabber arms 120a, 120b are moved into the closed position around the refuse container 404. As a result, many or all of the openings 228a-j the deformable structure 126a, 126b of the grippers 122a, 122b collapse in response to the force applied to the grippers 122a, 122b by the surface of refuse container 404. The collapse of one or more openings 228a-j the deformable structure 126a, 126b of the grippers 122a, 122b in response to the force applied to the grippers 122a, 122b by the surface of a refuse container 404 that has a width that is larger than the distance 162 between the grabber arms 120a, 120b in the closed position allows the grippers 122a, 122b to deform when engaging the large refuse container 404, which prevents damage to the refuse container 404.

As can be seen in FIGS. 4A and 4B, by including collapsible grippers 122a, 122b on the grabber arms 120a, 120b, the vehicle 102 can engage multiple container sizes (such as 32-gallon refuse containers, 48-gallon refuse container, 64-gallon refuse containers, and/or 96-gallon refuse containers) without needing to adjust the preset distance 162 between the grabber arms 120a, 120b in the closed position, while simultaneously avoiding damage to the containers during refuse collection. As a result, the efficiency and safety of operating the vehicle 102 is improved, as operators 150 can collect multiple sizes of refuse containers using the vehicle 102 without having to adjust the distance 162 between the grabber arms 120a, 120b in the closed position.

After the grabber arms 120a, 120b are in a closed position and refuse container 104 is engaged by the grabber assembly 112, as depicted in FIGS. 4A and 4B, the engaged refuse container 104 is lifted by the lift arm 110 to dump the contents of the refuse container 104 into the hopper 106 of the refuse collection vehicle 102. The grabber assembly 112 maintains the pressure applied by the grabber arms 120a and 120b to the refuse container 104 throughout the process of lifting the container 104 and dumping the contents of the container 104 to ensure that the container 104 is not prematurely dropped.

After the contents of the engaged refuse container 104 are dumped into the hopper 106 of the refuse collection vehicle 102, the lift arm 110 is lowered to return the refuse container 104 to the ground (or to another surface on which the refuse container was positioned when initially engaged by the grabber assembly 112). Once the refuse container 104 has been lowered to the ground or other placement surface, the grabber arms 120a and 120b move apart from one another to an open position, which releases the refuse container 104 from the grabber assembly 112.

A gripper (e.g., grippers 122a, 122b of FIGS. 1 and 2A-2D) configured to grip the refuse container 104 can be manufactured by the following process or similar processes. In an example manufacturing process, the insert 234 of the gripper 122b is formed from a material that includes one or more openings therethrough. For example, a portion of the insert 234 can be removed to create a set of openings 240a-e, each opening 240a-e in the set of openings 240a-e being configured to receive a respective fastener 242. Another portion of the insert 234 can be removed to create another set of openings 246a-f to further couple the insert 234 to the gripper 122b. This subsequent set of openings 246a-f increases the overall surface area of the insert 234 that contacts the deformable structure 126b and laterally adheres the insert to the deformable structure 126b. The openings 246a-f through the insert 234 can be formed, for example, by drilling or punching the openings through the insert 234. The material used to form the insert 234 can be a metal, a fiberglass (such as a nylon-reinforced fiberglass), or a rubber material.

In some implementations, an end portion 252 of the insert 234 is bent or otherwise formed to conform to a corresponding portion 164 of the support arm 124b of FIG. 1). Another end portion 254 of the insert 234 can bent to conform to another corresponding portion 166 of the support arm 124b. For example, as shown in FIG. 2D, the insert 234 is not straight. Opposite ends 248, 250 of the insert 234 are angled (bent) towards each other, causing the end portions 252, 254 to curve inwards toward a center portion 256 of the insert 234. The end portions 252, 254 can be formed by stamping, molding, or welding multiple sections together to form the insert 234.

The insert 234 can then be placed in a mold that defines a negative of the deformable structure 126b of the gripper 122b. In some implementations, the insert 234 is removably coupled to the mold using one or more fasteners, such as one or more screws or pins, during the molding process, and after molding is complete the one or more fasteners coupling the insert to the mold are removed. Once the insert 234 is placed within the mold, a flowable material is injected into the mold to form a deformable structure 126b surrounding and coupled to the insert 234. For example, the flowable material is flowed around the insert 234 and through the one or more openings 246a-f in the insert 234. The flowable material can be a rubber.

In some implementations, end portions 252, 254 of the insert 234 extend outside the mold. As a result, the flowable material does not contact the end portions 252, 254 or fill the openings 240a-e on the end portions 252, 254 that are configured to receive fasteners therethrough.

Once the flowable material has cured, gripper 122b is removed from the mold. The deformable structure 126b formed by the above-described molding process is configured to deform in response to application of a threshold force being applied to a surface of the deformable structure 126b (e.g., by a refuse container 104 contacting the deformable structure 126b).

In some implementations, the gripper 122b to grip a refuse container 104 can be manufactured using a three-dimensional (3D) printing process. For example, a three-dimensional printer (not shown) can be used print a first layer (not shown) of the deformable structure (e.g., deformable structure 126a, 126b of FIGS. 1 and 2A-2D) using a three-dimensional filament (not shown). The first layer can be printed using one or multiple passes of the 3D printer on a surface (not shown). In some implementations, the first layer is a support layer of the deformable structure 126b. The first layer can be printed onto a heated bed (not shown).

Once the first layer has been printed, the three-dimensional printing can be paused and the insert 234 can be positioned on a top surface of the first layer. Alternatively, the insert 234 can be printed using another three-dimensional filament (not shown), for example, a metal filament. Once the insert 234 is placed onto the first layer of the deformable structure 126b, the three-dimensional printing is resumed and the three-dimensional printer can print another layer on the top surface of the first layer and over the insert 234, either in one or many passes, with the three-dimensional filament. The subsequent layer can form the second layer of the deformable structure 126b with openings that deform in response to application of a threshold force to a surface of the deformable structure 126b (for example, by a refuse container 104 gripped by the deformable structure 126b).

In some implementations, once 3D printing of the subsequent layer is complete, the heated bed is be cooled. As the heated bed cools, the layers of the gripper 122b cool and cure to form a deformable gripper structure for gripping the refuse container 104.

The three-dimensional filament used for 3D printing the deformable structure 126b can be a rubber filament. In some cases, manufacturing the three-dimensional printed gripper 122b can include positioning a flexible support layer (not shown) of mesh fibers on a back surface of the gripper 122b to add strength at a back surface of the gripper 122b, and the back surface of the gripper 122b can be attached to the support arm 124b of the grabber assembly 112. 3D printing the deformable structure 126b can include printing a textured surface on a surface of the deformable structure 126b configured to contact the refuse container 104 in order to increase the friction between the gripper 122b and the refuse container 104, and, as a result, improve the engagement between the gripper 122b and the refuse container 104.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:
1. A refuse collection vehicle comprising:
  a refuse grabber assembly comprising:
    a first grabber arm comprising:
      a first gripper comprising:
        a first insert having a first plurality of openings extending through the first insert; and
        a first deformable structure configured to contact a first surface of a refuse container, the first deformable structure defining a first lattice with a first internal web that deforms in response to application of a threshold force on a surface of the first gripper, a portion of the first deformable structure extending through and coupled to at least one opening of the first plurality of openings of the first insert;

a first support arm coupled to the first gripper by the first insert; and
a second grabber arm comprising:
a second gripper comprising:
a second insert having a second plurality of openings extending through the second insert;
a second deformable structure configured to contact a second surface of the refuse container, the second deformable structure defining a second lattice with a second internal web that deforms in response to application of a threshold force on a surface of the second gripper, a portion of the second deformable structure extending through and coupled to at least one of the second plurality of openings of the second insert; and
a second support arm coupled to the second gripper by the second insert,
wherein the first grabber arm and the second grabber arm are configured to cooperate to engage the refuse container;
a lift arm coupled to the refuse grabber assembly, the lift arm operable to position the refuse grabber assembly; and
a hopper configured to receive refuse from the refuse container.

2. The refuse collection vehicle of claim 1, wherein:
the first internal web comprises at least two adjacent non-parallel walls; and
the second internal web comprises at least two adjacent non-parallel walls.

3. The refuse collection vehicle of claim 1, wherein:
the first deformable structure comprises a third plurality of openings, wherein at least one opening of the third plurality of openings is configured to collapse in response to application of a threshold force to a first surface of the first deformable structure; and
the second deformable structure comprises a fourth plurality of openings, wherein at least one opening of the fourth plurality of openings is configured to collapse in response to application of the threshold force to a second surface of the second deformable structure.

4. The refuse collection vehicle of claim 3, wherein each opening of the third plurality of openings and the fourth plurality of openings are triangular shaped.

5. The refuse collection vehicle of claim 1 wherein:
a portion of the first insert is surrounded by the first deformable structure; and
a portion of the second insert is surrounded by the second deformable structure.

6. The refuse collection vehicle of claim 1, wherein:
the first insert comprises a fifth plurality of openings therethrough; and
the second insert comprises a sixth plurality of openings therethrough.

7. The refuse collection vehicle of claim 6, wherein:
at least one of the fifth plurality of openings is configured to receive a first fastener; and
at least one of the sixth plurality of openings is configured to receive a second fastener.

8. The refuse collection vehicle of claim 1, further comprising:
a first plurality of fasteners configured to couple the first gripper to the first support arm; and
a second plurality of fasteners configured to couple the second gripper to the second support arm.

9. The refuse collection vehicle of claim 1, wherein the first insert and the second insert each comprise at least one of a metal or a nylon reinforced fiberglass.

10. The refuse collection vehicle of claim 1, wherein the first deformable structure and the second deformable structure each comprise a rubber material.

11. A refuse grabber assembly comprising:
a grabber arm operable to engage a refuse container, the grabber arm comprising:
a gripper comprising:
an insert having a plurality of openings extending through the insert; and
a deformable structure configured to contact a surface of the refuse container, the deformable structure defining a lattice with internal webs that buckle during gripping, a portion of the deformable structure extending through and coupled to at least one opening of the plurality of openings; and
a support arm coupled to the gripper.

12. The refuse grabber assembly of claim 11, wherein the deformable structure comprises a second plurality of openings, wherein at least one opening of the second plurality of openings is configured to collapse in response to application of a threshold amount of force to a surface of the deformable structure.

13. The refuse grabber assembly of claim 12, wherein the at least one opening of the second plurality of openings is configured to collapse in order to conform the surface of the deformable structure to the surface of the refuse container.

14. The refuse grabber assembly of claim 11, wherein
the deformable structure surrounds a portion of the insert.

15. The refuse grabber assembly of claim 11, wherein a surface of the deformable structure comprises a texture.

16. The refuse grabber assembly of claim 11, wherein at least two webs of the internal webs have adjacent ends and are non-parallel.

17. The refuse grabber assembly of claim 11, wherein:
the grabber arm is a first grabber arm;
the gripper is a first gripper;
the deformable structure is a first deformable structure;
the insert is a first insert;
the support arm is a first support arm;
the surface of the refuse container is a first surface of the refuse container; and
the refuse grabber assembly further comprises:
a second grabber arm opposite the first grabber arm and operable to engage the refuse container, the second grabber arm comprising:
a second gripper comprising:
a second insert having a second plurality of openings extending through the second insert; and
a second deformable structure configured to contact a second surface of the refuse container, the second deformable structure defining a second lattice with internal webs that buckle during gripping, a portion of the second deformable structure extending through and coupled to at least one opening of the second plurality of openings; and
a second support arm coupled to the second gripper,
wherein the first grabber arm and the second grabber arm cooperate to engage the refuse container.

18. The refuse grabber assembly of claim 11, further comprising at least one fastener configured to couple the gripper to the support arm.

* * * * *